Figure 1:
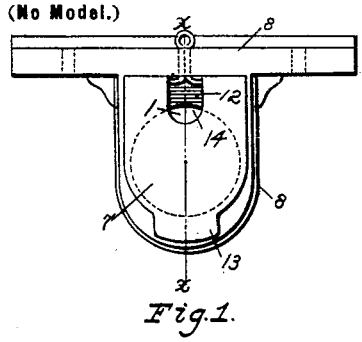

No. 710,677. Patented Oct. 7, 1902.
J. R. FLEMING.
CAR AXLE LUBRICATOR.
(Application filed Dec. 9, 1901.)
(No Model.)

WITNESSES:
B. G. LaBar,
W. G. Moran.

INVENTOR,
James R. Fleming
BY D. B. Replogle
ATTORNEY

UNITED STATES PATENT OFFICE.

JAMES R. FLEMING, OF SCRANTON, PENNSYLVANIA.

CAR-AXLE LUBRICATOR.

SPECIFICATION forming part of Letters Patent No. 710,677, dated October 7, 1902.

Application filed December 9, 1901. Serial No. 85,132. (No model.)

*To all whom it may concern:*

Be it known that I, JAMES R. FLEMING, a citizen of the United States, residing at Scranton, in the county of Lackawanna and State of Pennsylvania, have invented certain new and useful Improvements in Car-Axle Lubricators, of which the following is a specification, reference being had therein to the accompanying drawings.

This invention relates to car-axle lubricators of the class suitable for cars and trucks used about mines in which the car-wheel is revoluble on the axle and the axle in addition thereto is revoluble in a car-axle box.

The objects of the invention are to provide a more certain and efficient means of conducting lubricant from the car-axle box into the interior of the revoluble wheel on the axle, to provide a space for absorbent in connection with such lubricator, to render such lubricators more efficient and simplify them in general, and other objects, as set forth in this specification, and pointed out in the claims.

To these ends the invention consists in the construction, arrangement, and combination of parts, as specified, and illustrated in the drawings, in which—

Figure 2:
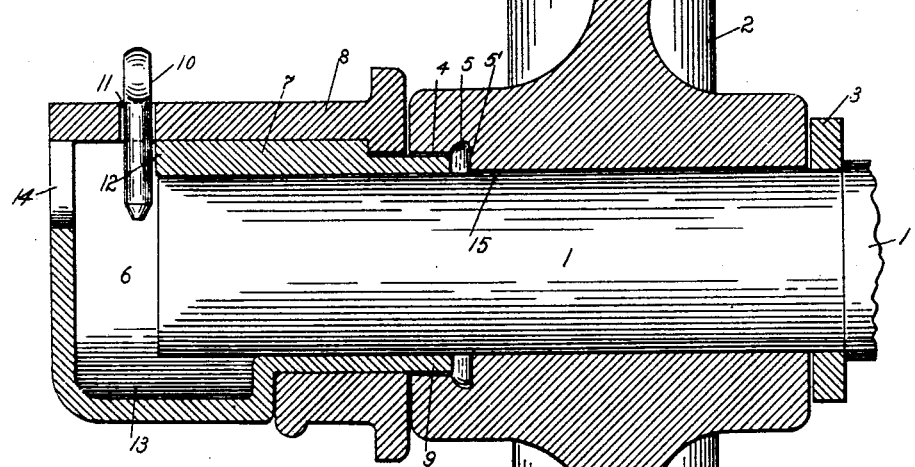
Figure 3:
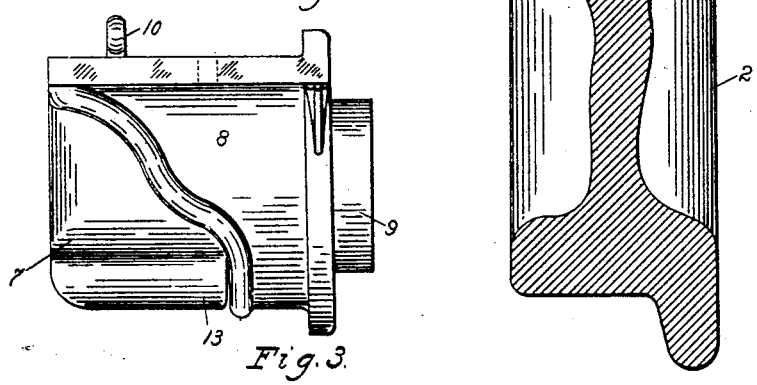

Figure 1 is an outer end elevation of a car-axle box embodying my improved lubricator. Fig. 2 is a cross-section of a car-wheel and a car-axle box embodying my lubricator, taken on a line corresponding to x x of Fig. 1. Fig. 3 is an exterior side view of the car-axle box when removed from the wheel and axle.

Similar characters of reference denote like and corresponding parts throughout the several views.

Referring to the drawings, 1 denotes the axle of a mining-car, to which a wheel 2 is revolubly mounted on the axle 1, abutting against the collar 3, secured to the axle 1. The outer part of the bore in the car-wheel is enlarged at 4, the inner part of the enlargement terminating in an annular recess 5, arranged to have lubricant conducted into it from the lubricant-chamber 6. The lubricant-chamber 6 is an enlargement of the interior of the thimble or sheath 7, fitting on the outer end of the axle and into the axle-box 8. This thimble has a projecting flange 9 extending into the enlarged bore 4 of the car-wheel 2. When the parts are assembled, a pin 10, which is preferably split, is inserted down through a hole 11 of the axle-box and arranged so that the edge 12 of the thimble 7 impinges thereon, and the thimble is thus prevented from slipping out of its place. The chamber 6 is amplified by a pocket 13, extending downward and communicating to the under side of the axle, thus making an adequate space in which to insert waste. Access to the chamber 6 is had through an opening 14 in the upper side of the thimble 7. When the parts are fitted together, the lower ends of the split pin 10 may be spread, as shown in Fig. 1, so as to prevent it from being readily withdrawn.

The operation of the device is readily explained. The wheel is first inserted onto the axle, with its enlarged bore outward. The sheath or thimble 7 is then inserted into the box or bracket 8, which is adapted to be bolted to the timbers of the car, and the pin 10 is then inserted into the hole 11 and spread, so as to prevent the sheath 7 and box 8 from separating. Waste and lubricant are then inserted through the opening 14, and during the operation of the car lubricant finds its way along the axle into the annular recess 5, where it may gather in considerable quantity without exuding between the flange 9 and the concave surface of the bore 4. While therein contained during the revolution of the wheel considerable lubricant may adhere to the rear wall 5' of the annular recess 5 and by gravity is conducted downward to the top surface of the axle 1 in the vicinity of 15, where there is considerable space between the concave surface of the bore in the wheel and the upper surface of the axle by reason of the weight of the axle on the lower side of the bore in the wheel. As the wheel revolves the lubricant is distributed readily to the rest of the interior.

I do not wish to be confined to the exact description of the exterior of the boxing used in connection with my device, as many of the details may be varied without departing from the general spirit of my invention. I am also aware of Patent No. 524,200, issued to John F. Gallagher, (1894,) and do not claim as mine any of the matter therein shown.

What I do claim, and desire to secure by Letters Patent, is—

1. The herein-described car-axle lubricator comprising a car-wheel with part of the bore enlarged, there being an annular recess extending around the interior of the wheel, a car-axle extending through the wheel, and a thimble or sheath over the end thereof, the said sheath having an annular extension projecting into the enlarged bore of the wheel, and closing one side of the annular recess therein, substantially as and for the purpose specified.

2. In a car-axle lubricator, the combination with the car-axle of a revoluble wheel mounted thereon, a thimble or sheath having a lubricant-receptacle adapted to slide over the end of the axle, there being an enlarged bore at one side of the wheel, and an extension on the sheath aforesaid arranged to enter within the said bore, the said enlarged bore being provided with an annular recess or enlargement at its inner termination, and the said sheath arranged to conduct lubricant therein, substantially as and for the purpose specified.

3. A lubricator for car-axles comprising in combination with the axle, a revoluble car-wheel mounted thereon, there being an enlargement in the bore of the said wheel, and an annular recess at the inner termination of said enlargement, together with a lubricant-containing sheath adapted to be slid over the end of the axle, and having an extension arranged to enter into the enlarged bore to the vicinity of the annular recess within the wheel, substantially as specified.

4. A car-axle lubricator comprising in combination with a car-wheel, revolubly mounted on a car-axle, a sheath placed over the end of the axle, having an extension entering into an enlarged bore of the wheel, a bracket adapted to be secured to the timbers of the car embracing said sheath, there being a hole through a projection of said bracket, and a pin extending therethrough and engaging with the outer end of the sheath aforesaid for the purpose of holding it in place, substantially as and for the purpose specified.

5. The herein-described car-axle lubricator comprising in combination with a car-axle, a car-wheel revolubly mounted thereon, there being an enlarged bore in said car-wheel, the said enlarged bore terminating in an annular recess in the interior of the wheel, a thimble or sheath placed over the end of the axle having an annular extension thereon entering into the car-wheel and closing one side of the annular recess therein, the opposite end of said thimble or sheath constituting a lubricant-chamber, the lower wall thereof being arranged at a lower level than the lower side of the car-axle, whereby an amplified space is provided for containing waste, or other lubricant-absorbent, for the purpose of facilitating the conduction of lubricant to the parts, substantially as specified.

In testimony whereof I affix my signature in presence of two witnesses.

JAMES R. FLEMING.

Witnesses:
  MYRTLE REED,
  D. G. MORAN.